Figure 1:
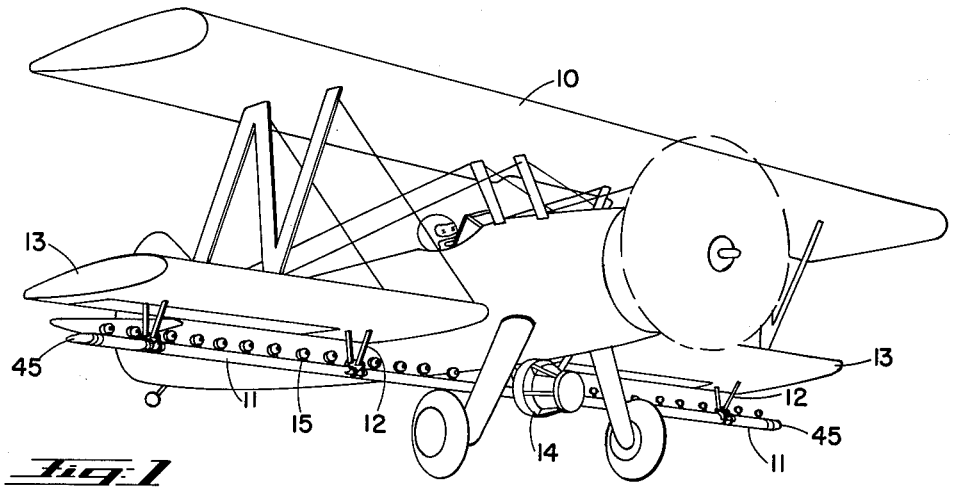

April 11, 1961     D. M. LIEBHART     2,979,273

SPRAY BOOM FOR AIRCRAFT

Filed Dec. 8, 1958

INVENTOR.
DORSEY M. LIEBHART
BY
ATTORNEY

2,979,273
SPRAY BOOM FOR AIRCRAFT
Dorsey M. Liebhart, 5224 NE. 42nd Ave., Portland, Oreg.
Filed Dec. 8, 1958, Ser. No. 778,914
5 Claims. (Cl. 239—550)

This invention relates to a novel and improved form of construction of a spray boom for spraying crops from an airplane or other aircraft.

A spray boom is a liquid conduit ordinarily mounted underneath a wing or behind the trailing edge of a wing of an aircraft used for crop spraying. Such spray booms usually extend laterally on opposite sides of the fuselage approximately from wing tip to wing tip and are equipped at intervals with spray nozzles adapted to spray as wide a swath as possible as the airplane flies back and forth in a predetermined pattern low over the ground. Heretofore it has been the practice to use ordinary pipe or tubing for such spray booms and to mount the spray nozzles or nozzle risers or nipples on such pipe by welding. Welding has proved unsatisfactory, however, because of weld failure from vibration and because of the high cost of fabricating the equipment in such manner. A round pipe also produces excessive drag on the airplane which reduces its maximum allowable load of spray material whereby the airplane must land at frequent intervals for refilling of its spray tanks.

Objects of the present invention are, therefore, to provide an improved spray boom of airfoil shape to minimize drag in the air stream, to provide a spray boom which may be extruded economically from an extrudable material such as aluminum, to provide a spray boom which may be assembled with nozzles, hanger brackets and other accessories at low cost, to provide a spray boom which will withstand vibration better than conventional booms, to provide a spray boom of relatively thin wall section and light weight yet which is sufficiently stiff and strong for the purpose, to provide a spray boom in which the nozzle nipples may be threaded instead of welded to the boom, to provide a spray boom having a thin wall section with internally thickened portions which may be drilled and tapped to receive nozzle nipples in optional positions and to provide a spray boom in which such thickened portions are externally marked and equipped to facilitate drilling for the nozzle nipples.

In accordance with the foregoing objects, the present spray boom preferably comprises a hollow aluminum extrusion of airfoil shape to convey the liquid spray material to the spraying nozzles. The wall section is thickened on one side such as the top side and also at its trailing edge to provide longitudinal stiffening ribs and also to provide a thickness of material at these points sufficient for drilling and tapping to receive the nozzle nipples, the two thickened portions providing an option in the location of the nozzles. The locations of the thickened portions are marked on the outer surface of the boom by shallow longitudinal grooves which also serve to facilitate the starting of the drill in drilling holes for mounting the nozzles.

The foregoing and other objects and advantages will become apparent and the invention will be better understood with reference to the following detailed description of the preferred embodiment illustrated on the accompanying drawing. Various changes may be made, however, in the construction and arrangement of parts and all such modifications within the scope of the appended claims are included in the invention.

Figure 2:
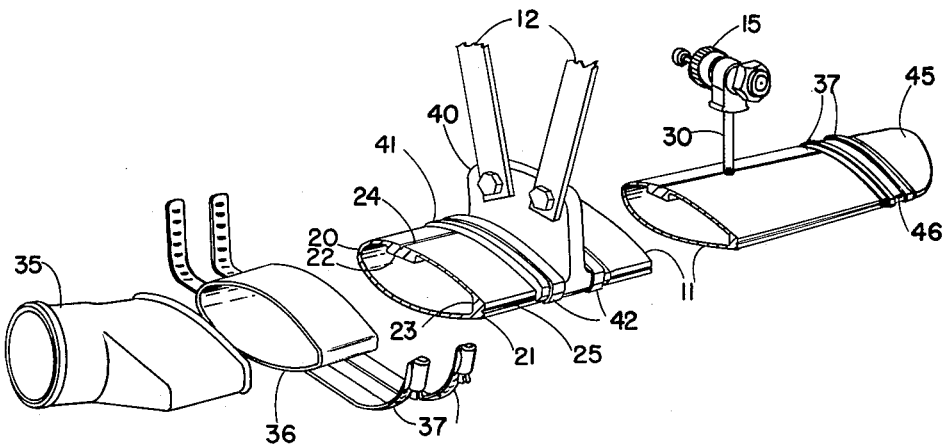

In the drawing:

Figure 1 is a perspective view of a crop spraying airplane in flight, equipped with the present spray boom; and Figure 2 is an exploded perspective view with parts removed and broken away showing the construction of the boom with its various mountings and connections.

Figure 1 shows an airplane 10 having a pair of spray booms 11 mounted on suitable brackets 12 on the underside of the lower wings 13. Inside the fuselage of the airplane is a tank, not shown, for liquid spray material which is pumped into the spray booms 11 under pressure by a pump 14. Pump 14 is connected with the inboard ends of the two spray booms by a suitable Y or T fitting, not shown. The spray booms are equipped with a plurality of nozzles 15 which are exposed to the air stream in the usual manner.

Details of one of the spray booms 11 are shown in Figure 2. The spray boom is a hollow extruded aluminum tube having a substantially smooth and curved exterior surface of airfoil shape in cross section profile. As an example of a suitable airfoil profile, a boom having a vertical thickness of one inch at its point of maximum thickness has a chord length from front to rear of approximately 2.7 inches. The point of maximum vertical thickness is approximately .86 inch behind the rounded leading edge 20. The trailing edge 21 instead of tapering to a thin feather edge consists of a flat surface approximately .16 inch in vertical height perpendicular to the chord line.

The wall section of the tube is quite thin, .051 inch being appropriate for the particular example given. The wall section is of uniform thickness throughout the profile section except for two internal longitudinal stiffening ribs 22 and 23. In the example given, the total wall thickness through rib 22 is approximately .312 inch and the rib is approximately .625 inch wide in a direction lengthwise of the chord. The center of rib 22 is approximately one inch back in a chordwise direction from the leading edge 20, this central line of the rib being marked on the upper surface of the boom by a shallow groove 24. The corners between the horizontal and vertical sides of the rib are rounded and the vertical side surfaces of the rib merge into the under surface of the top wall of the boom in rounded or filleted contours to avoid any sharp angles which would produce high stress concentrations.

The stiffening rib 23 at the trailing edge is approximately .312 inch thick in a horizontal or chordwise direction, the interior angles again being rounded or filleted to avoid sharp corners. The center of this rib is marked by a shallow groove 25 which thus lies in the center of the vertical trailing edge surface 21.

The upper and lower external surfaces preferably have the same curvature whereby the external surface outline is symmetrical above and below the chord line. The foregoing dimensions are not to be construed in a limiting sense but are illustrative only for the purpose of defining suitable ratios and proportions for an airfoil profile. These ratios and proportions, as well as the dimensions, may be varied considerably without departing from the spirit of the invention.

In addition to the stiffening function, the ribs 22 and 23 also provide thick wall portions in which holes may be drilled and tapped for threaded riser nipples 30 on the spray heads or nozzle bodies 15. The purpose of groove 24 is to mark the center of rib 22 for alignment of such holes in the center of the rib and also to facilitate the starting of the drill. Thus, in preparing to drill the boom to receive the spray heads, it is only necessary to measure off predetermined distances along the boom according to the spacing desired and no measurements need be made transversely of the boom to determine the position of rib 22 nor are punch marks necessary to hold th drill point in the desired position.

It is usually preferable to mount the spray heads on the upper side of the boom as shown so that when the pilot shuts off the spray at the end of a run down a field, both the boom and riser nipples will remain full of liquid for immediate spraying as soon as the pressure supply is again turned on. In some cases, however, it is desired to mount the spray nozzles on the trailing edge of the boom and, in such case, the groove 25 is utilized to mark the center of rib 23 for locating the nozzle positions and starting the drill as explained above. The flat end surface 21 is just wide enough in a vertical direction to receive the nipples 30 without having an objectionable width which would create unnecessary turbulence and drag in the air stream.

Thus, as a structural member, the boom 11 combines the strength characteristics of a tube and angle iron, the rib 22 forming a horizontal flange and the rib 23 forming a vertical flange of an equivalent angle iron. This shape of extrusion provides improved economy of material, improved liquid capacity and improved aerodynamic characteristics whereby a larger pay load of spray material may be carried and the equipment may be produced at lower cost than in the case of conventional round tubular spray booms.

The inner end of each boom 11 is equipped with a suitable hose adapter 35 having a round end for connection with the spray pump 14. A rubber hose connector 36 joins the adapter 35 with the inner end of the spray boom with a slight spacing between the adapter and boom to allow for relative movement from sway and vibration. In assembling the parts, the boom and adapter are pushed into opposite ends of hose connector 36 so that one strap type hose clamp 37 may be tightened on the boom and the other clamp tightened on the adapter. The adapters 35 on the two booms are connected to the opposite arms of the Y or T fitting on the pump outlet. Any movement of the airplane wings in the sharp turns at the ends of the field does not bend the booms 11 appreciably but, instead, merely flexes the hose connectors 36.

A boom hanger casting 40 connected to the brackets 12 is equipped with a curved shoe or base portion 41 contoured to fit the top airfoil surface of the boom. The shoe or base 41 is secured to the boom by a pair of clamps 42 similar to the hose clamps 37.

The outer end of each boom is closed by an end cap 45. A hose connector 46 envelops the abutting ends of the cap and boom and is secured to both members by another pair of hose clamps 37. The end caps 45 are thereby removable for cleaning out the boom.

It will be appreciated that the present boom may be mounted behind the trailing edge of the wing with equal facility by merely employing different hanger brackets 12 to hold the boom in the desired position. The boom may also be used on helicopters or any other type of aircraft suitable for spraying crops.

It will be apparent that the reinforcement feature may also be incorporated in a boom of circular cross section for installations where a streamlined profile is not considered necessary. In such case a single internal stiffening rib may be sufficient as the rib may be turned uppermost for top nozzle mounting or turned rearwardly for mounting the nozzles in trailing position.

Having now described my invention and in what manner the same may be used, what I claim as new and desire to protect by Letters Patent is:

1. An aircraft spray boom comprising a tube having an approximately elliptical cross section with an internally thickened wall portion forming a stiffening rib extending longitudinally within said tube, spray nozzles mounted in said rib, an end cap on the outer end of said boom, a supply hose adapter on the inner end of the boom, rubber hose connectors securing said end cap and adapter to the boom, hanger brackets having portions conforming to the contour of the boom, and strap type hose clamps on said hose connectors and hanger brackets encircling the boom.

2. An aircraft spray boom adapted to facilitate the drilling of holes of predetermined size therein for mounting spray nozzles on the outside of the boom, comprising an extruded tube of approximately elliptical cross section having a streamlined outer surface, said tube having an internal longitudinal stiffening rib providing a thickened wall section for mounting a series of said nozzles at intervals along the boom, and said outer surface having a shallow longitudinal groove marking the center line of said rib and of narrow width in relation to said predetermined size of holes to function as a punch mark for holding a drill point on said center line in drilling said holes.

3. An aircraft spray boom adapted to facilitate the drilling of holes of predetermined size therein for mounting spray nozzles on the outside of the boom, comprising an extruded tube of approximately elliptical cross section having a streamlined outer surface, one side of said elliptical cross section being rounded to form an airfoil leading edge on the boom and the opposite side of said elliptical cross section being narrowed to form an airfoil trailing edge on the boom, said trailing edge having a flat outer surface perpendicular to a chord line between said leading and trailing edges, the wall section of said tube being thickened at said trailing edge to form an internal stiffening rib for the boom and support for a series of said nozzles at intervals along the boom, and said flat surface having a shallow longitudinal groove marking the center line of said rib and of narrow width in relation to said predetermined size of holes to function as a punch mark for holding a drill point on said center line in drilling said holes.

4. An aircraft spray boom comprising an extruded tube of approximately elliptical cross section having a streamlined outer surface, one side of said elliptical cross section being rounded to form an airfoil leading edge on the boom and the opposite side of said elliptical cross section being narrowed to form an airfoil trailing edge on the boom, said trailing edge having a flat, outer surface perpendicular to a chord line between said leading and trailing edges, the wall section of said tube being thickened at said trailing edge to form an internal stiffening rib for the boom, said tube having an internal longitudinal stiffening rib providing a thickened wall section on one side of the tube intermediate said leading and trailing edges, a series of spray nozzles outside of said tube mounted in holes in one of said ribs at intervals along the boom, and said outer surface having a shallow longitudinal groove marking the center line of each rib and of narrow width in relation to the size of said holes to function as a punch mark for holding a drill point on said center line in drilling said holes.

5. An aircraft spray boom comprising a tube having an approximately elliptical cross section with a streamlined outer surface, said tube having two internally thickened wall portions forming a first stiffening rib extending longitudinally within the tube on one side thereof in an intermediate position between the ends of the ellipse and a second similar stiffening rib at one end of the ellipse, exterior spray nozzles mounted in one of said ribs, a removable end cap on one end of said boom for cleaning the boom, a connector on the other end of the boom for connecting the boom with a source of spray material, hanger brackets having portions conforming to the contour of the boom, and means securing the boom to said brackets.

References Cited in the file of this patent

UNITED STATES PATENTS

| | | |
|---|---|---|
| 2,030,830 | Hibner | Feb. 11, 1936 |
| 2,493,017 | Nutter | Jan. 3, 1950 |
| 2,504,580 | Pierson | Apr. 18, 1950 |
| 2,631,058 | Ingham | Mar. 10, 1953 |
| 2,642,314 | Dupasquier | June 16, 1953 |